United States Patent
Saude et al.

(10) Patent No.: US 11,762,515 B1
(45) Date of Patent: Sep. 19, 2023

(54) TOUCH AND HOVER SENSING ON SINGLE-LAYER SEGMENTED SHEETS

(71) Applicant: Samsung Electronics Company, Ltd., Gyeonggi-Do (KR)

(72) Inventors: Mohammad J. Abu Saude, Sunnyvale, CA (US); Sergio Perdices-Gonzalez, Sunnyvale, CA (US); William Augustus Workman, San Francisco, CA (US); Dean N. Reading, Sunnyvale, CA (US); Hanjin Park, Gyeonggi-do (KR); Marc Estruch Tena, San Jose, CA (US); Sajid Hassan Sadi, San Jose, CA (US)

(73) Assignee: Samsung Electronics Co., Ltd., Suwon si (KR)

( * ) Notice: Subject to any disclaimer, the term of this patent is extended or adjusted under 35 U.S.C. 154(b) by 0 days.

(21) Appl. No.: 17/827,519

(22) Filed: May 27, 2022

(51) Int. Cl.
  *G06F 3/044* (2006.01)
  *G06F 3/041* (2006.01)

(52) U.S. Cl.
  CPC ........ *G06F 3/0445* (2019.05); *G06F 3/04186* (2019.05); *G06F 2203/04108* (2013.01)

(58) Field of Classification Search
  CPC .............. G06F 3/0445; G06F 3/04186; G06F 2203/04108
  See application file for complete search history.

(56) References Cited

U.S. PATENT DOCUMENTS

| | | | |
|---|---|---|---|
| 10,331,278 B2 | 6/2019 | Hotelling | |
| 10,488,952 B2 | 11/2019 | Sundara-Rajan | |
| 10,908,758 B2 | 2/2021 | Rhe | |
| 11,048,360 B2 | 6/2021 | Jang | |
| 2017/0139527 A1* | 5/2017 | Nathan | ................... G06V 10/26 |
| 2019/0146609 A1 | 5/2019 | Chang | |
| 2019/0310731 A1 | 10/2019 | Rhe | |
| 2021/0026472 A1* | 1/2021 | Parker | ................. G06F 16/2282 |

FOREIGN PATENT DOCUMENTS

KR 10-1481963 1/2015

* cited by examiner

*Primary Examiner* — Afroza Chowdhury

(57) ABSTRACT

In one embodiment, a method includes by an electronic device: receiving sensor data indicative of a touch input from one or more sensors of a touch panel of the electronic device, where the touch input occurs at a detected touch location of the touch panel, accessing a baseline of signal data corresponding to the touch panel, calculating a delta change based on the baseline of the signal data and the sensor data, determining a touch state corresponding to the touch input based on a comparison of the delta change to a plurality of touch threshold levels, selecting a touch location prediction method from a plurality of touch location prediction methods based on the touch state, and determining a predicted touch location of the touch input based on the touch location prediction method and the sensor data.

20 Claims, 14 Drawing Sheets

TOUCH AND HOVER SENSING ON SINGLE-LAYER SEGMENTED SHEETS

TECHNICAL FIELD

This disclosure relates generally to display technology, and in particular sensors in a touch-screen display.

BACKGROUND

Current touch input technologies become expensive when scaled to large surfaces or non-flat applications, such as large-scale non-flat (e.g., curved) TVs. Most of the touch-screen technologies are manufactured onto a rigid glass substrate using a multi-layered, row-column matrix using high conductive material such as ITO. Therefore, the cost for large touch screens is high. In addition, there is a lack of flexible and non-flat (or irregular shaped) touch capability surfaces.

DESCRIPTION OF EXAMPLE EMBODIMENTS

Machine-Learning System Overview

Figure 1:
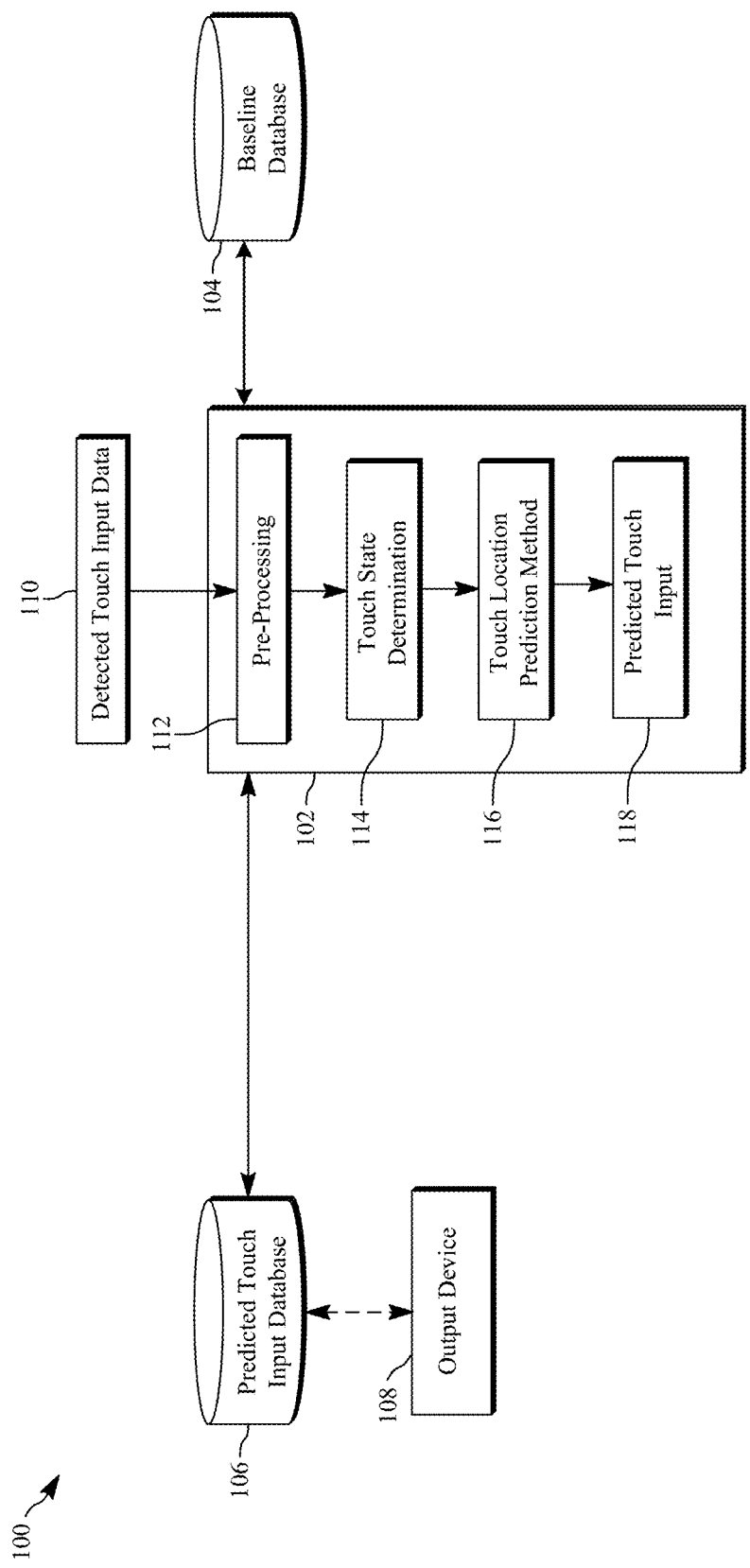
FIG. 1 illustrates an example machine-learning system.

FIG. 1 illustrates an example prediction system 100. As depicted by FIG. 1, the prediction system 100 may include a touch sensing system 102, one or more databases (e.g. baseline database 104, predicted touch input database 106), and an output device 108. In particular embodiments, the touch sensing system 102 may include a cloud-based cluster computing architecture, client-based computing architecture, or other similar computing architecture that may receive one or more touch sensor data 110, which may be provided by one or more input devices (e.g., tactile and haptic human-interface devices (HID) technologies, such as touch sensing technologies, touch panel displays, acoustic touch panels, 3D hand localization, and the like) as described herein. In particular embodiments, the touch sensor data 110 may be indicative of signals received by one or more input devices. In particular embodiments, the touch sensor data may indicate one or more of a hover touch, a single touch, or multi-touch input received by one or more input devices. While this disclosure describes receiving touch sensor data, this disclosure contemplates receiving general haptic input data. The haptic input data may be used in place of the touch sensor data. In particular embodiments, the prediction system 100 may be coupled to a HID. The HID may use the prediction system 100 to accurately predict actual coordinates of a touch input. Additionally, the touch sensing system 102 may be utilized to process and manage various analytics and/or data intelligence such as predicting the actual coordinates of a touch input, and so forth.

In particular embodiments, as further depicted by FIG. 1, the touch sensing system 102 may include a pre-processing functional block 112, a touch state determination functional block 114, a touch location prediction method block 116, and a predicted touch input functional block 118. In particular embodiments, the pre-processing functional block 112, the touch state determination functional block 114, the touch location prediction method block 116, and the predicted touch input functional block 118 may each include, for example, a computing engine. In particular embodiments, the pre-processing functional block 112 may receive the touch sensor data 110, which may include, for example, a touch location, such as a set of detected coordinates with respect to the HID, such as a touch panel. For example, the touch sensor data 110 may indicate a set of X-coordinates and a set of corresponding Y-coordinates with respect to the HID. The set of detected coordinates with respect to the HID can correspond to coordinates that are registered by the HID. For example, as a result of one or more sensor placements within the HID, the detected coordinate corresponding to a touch input may not be the same as an actual coordinate corresponding to a touch input. This may be the result of one or more coherent and incoherent noise. The pre-processing functional block 112 can send the preprocessed data to the touch state determination block 114.

In particular embodiments, the touch state determination block 114 may then interface with the baseline database 104 to access a baseline of the signal data of the HID (e.g., touch panel). The touch state determination block 114 can calculate a delta change based on the baseline of the signal data and the touch sensor data 110. The touch state determination block 114 can determine a touch state corresponding to the touch sensor data 110 based on a comparison of the delta change to a plurality of touch threshold levels. In particular embodiments, the touch state determination block 114 can send the determined touch state to the touch location prediction method block 116.

In particular embodiments, the touch location prediction method block 116 can select a touch location prediction method to be used to determine a predicted touch location. The touch location prediction method block 116 can use the determine touch state to select a touch location prediction method. In particular embodiments, the touch location prediction method block 116 can use one or more of a look up table method, a curve fitting method, or a machine learning model method. In particular embodiments, the touch location prediction method block 116 can use the selected touch location prediction method to generate a predicted touch input 118 that corresponds to a predicted touch location of the touch input. As an example and not by way of limitation, the predicted touch location can comprise an X-coordinate and a Y-coordinate of a touch panel indicating where the touch input is predicted to have occurred.

In particular embodiments, the pre-processing functional block 112 may also be utilized, for example, to split the touch sensor data 110 in an N number of datasets before providing to a machine-learning model (used by the touch location prediction method block 116) for training, cross-validating, and testing. Thus, in particular embodiments, the pre-processing functional block 112 may perform the pre-processing by, for example, accounting for the existence of one or more disjoint groups within a population and generating samples where the proportion of these groups is maintained. In particular embodiments, the pre-processing functional block 112 can process the touch sensor data 110 by putting the touch sensor data 110 in a buffer prior to sending to the machine-learning model. The pre-processing functional block 112 can process the touch sensor data 110 to determine a set of detected coordinates with respect to the HID.

In particular embodiments, a final pre-processing of the touch sensor data 110 may be performed before providing an output to the machine-learning model for training, cross-validating, and testing. For example, in particular embodiments, the machine-learning model may receive an N number of datasets (e.g., N arrays of touch sensor data 110 in 200 ms timeslots) generate an N number of long short term (LSTM) layers based thereon. In particular embodiments, outputs of the LSTM layers of the machine-learning model may be combined into a single array utilizing, for example, a concatenation layer of the machine-learning model. From the concatenation layer, the machine-learning model may then transfer the single array through one or more dense layers of the machine-learning model.

In particular embodiments, from the one or more dense layers, the machine-learning model may then transfer the single array through a sigmoid output layer of the machine-learning model. In particular embodiments, the sigmoid output layer of the machine-learning model may include, for example, a number of neurons (e.g., the number of neurons may be equal to the number of classes and/or classification labels) that may be utilized to classify the single array into individual classes, in which one or more final probabilities for individual classification labels may be calculated. In particular embodiments, the machine-learning model may also include a loss function that may be utilized to assign a higher weight to positive classification for individual classification labels, assuming that individual users and/or subgroups of users may typically not exceed more than a maximum number of users (e.g., N users).

For example, as further illustrated by FIG. 1, the touch sensing system 102 may provide the predicted touch input data 118 to the predicted touch input database 106. The predicted touch input data 118 may comprise a set of predicted coordinates corresponding to a predicted touch location, which are an estimate of a set of actual coordinates. In particular embodiments, as further depicted by FIG. 1, an output device 108 can receive the predicted touch input data 118. In particular embodiments, the output device 108 can be the HID, such as a touch panel. The output device 108 can display the predicted touch input data 118 on the HID.

Touch and Hover Sensing on Single-Layer Segmented Sheets

In particular embodiments, an electronic device comprising a touch panel structure can perform touch and hover sensing on single-layer segmented sheets. Current touch input technologies may become expensive when scaled to large surfaces or non-flat applications, such as large-scale non-flat (e.g., curved) TVs. Most of the touch input technologies may be manufactured onto a rigid glass substrate using a multi-layered, row-column matrix using high conductive material such as ITO. Therefore, the cost for large touch screens is high. In addition, there may be a lack of flexible and non-flat (or irregular shaped) touch capability surfaces.

In particular embodiments, to address the issues associated with scalability and unconventional surface shapes, touch panel designs or structures may be used to improve the cost analysis of the resulting capacitive-touch devices. As used herein, "touch panel structure or design" may refer to a sensor structure or sensor design implemented within an HID, such as a touchscreen, where one or more sensors are spaced apart at least a threshold distance from each other. In particular embodiments, the touch panel structure can comprise sets of sensors that are spaced apart at least a threshold distance from each other. As an example and not by way of limitation, a set of sensors of the HID may be positioned in a pattern on the HID, such as a stripe pattern. Although this disclosure describes touch panel structures in a particular manner, this disclosure contemplates touch panel structures in any suitable manner.

Certain technical challenges exist for implementing touch panel structures in a HID. One technical challenge may include a degradation of visibility of the display through the touchscreen display. The solution presented by the embodiments disclosed herein to address this challenge may be to use a single thin layer of patterned resistive material that results in less haze and better viewing angles. Another technical challenge may include signal processing of the measured signals from the sensors of a touch panel structure. The solution presented by the embodiments disclosed herein to address this challenge may be using a signal processing pipeline to detect a single touch, a multi touch, or a hover touch.

Certain embodiments disclosed herein may provide one or more technical advantages. A technical advantage of the embodiments may include imprecisely patterned and inexpensive touch panels enabled for use for rigid, flexible, and non-flat use cases. Another technical advantage of the embodiments include a signal collection and processing pipeline that enables sensing accurate user presence, interaction, or gestures. Another technical advantage of the embodiments may include enabled use of one or more active pens or one or more passive pens. Certain embodiments disclosed herein may provide none, some, or all of the above technical advantages. One or more other technical advantages may be readily apparent to one skilled in the art in view of the figures, descriptions, and claims of the present disclosure.

In particular embodiments, the electronic device (e.g., an electronic device coupled with the prediction system 100) may receive sensor data indicative of a touch input from one or more sensors of a touch panel of the electronic device. As an example and not by way of limitation, a user may use one of a finger or stylus to touch the touch panel, such as a touchscreen display. The touch input may comprise one or more of a single touch input, a multi touch input, or a hover touch input. In particular embodiments, the touch input may occur at a detected touch location of the touch panel. In particular embodiments, the touch panel may comprise a plurality of sensors. In particular embodiments, the plurality of sensors may be positioned in a pattern on the touch panel where a first subset of sensors are configured as source sensors and a second subset of sensors are configured as read sensors. In particular embodiments, the pattern may comprise one or more of a stripe pattern, a U-shaped stripe pattern, an H-shaped stripe pattern, a diamond-stripe pattern, a diamond-middle-stripe pattern, a full-wriggle-stripe pattern, a wriggle-middle-stripe pattern, a triangle-rectanglestripe pattern, a triangle-stripe pattern, or a double-triangle-stripe pattern. Although this disclosure describes receiving sensor data in a particular manner, this disclosure contemplates receiving sensor data in any suitable manner.

In particular embodiments, the electronic device may access a baseline of signal data corresponding to the touch panel. As an example and not by way of limitation, the electronic device may store data corresponding to the baseline of signal data corresponding to the touch panel in a datastore of the electronic device to be accessed at a future time. The baseline of the signal data can correspond to signal data of the touch panel during an idle state. Although this disclosure describes accessing baseline data in a particular manner, this disclosure contemplates accessing baseline data in any suitable manner.

In particular embodiments, the electronic device may calculate a delta change based on the baseline of the signal data and the sensor data. As an example and not by way of limitation, the electronic device can calculate a difference between the baseline of the signal data and the sensor data to determine the delta change. In particular embodiments, the electronic device can inject a plurality of signals into one or more of the source sensors. In particular embodiments, the plurality of signals comprise at least a first signal at a first frequency and a second signal at a second frequency. In particular embodiments, the electronic device can inject a plurality of signals into the one or more of the source sensors using at least a first frequency. In particular embodiments, the electronic device can inject a plurality of signals into the one or more of the source sensors using any number of different frequencies. In particular embodiments, the electronic device can detect, by one or more of the read sensors, a plurality of attenuated measured signals based on the touch input interfacing the plurality of signals. The plurality of attenuated measured signals can be used to generate the sensor data. The delta change can be based on the baseline of the signal data and the attenuated measured signals. In particular embodiments, the electronic device can switch the first subset of sensors to be configured as read sensors and the second subset of sensors to be configured as source sensors at a predetermined frequency. In particular embodiments, the sensor data can include data from a plurality of attenuated measured signals based on the touch input interfacing a plurality of injected signals that are injected to each of the source sensors. Although this disclosure describes calculating a delta change in a particular manner, this disclosure contemplates calculating a delta change in any suitable manner.

In particular embodiments, the electronic device may determine a touch state corresponding to the touch input based on a comparison of the delta change to a plurality of touch threshold levels. As an example and not by way of limitation, the electronic device can analyze the delta change to determine which touch state corresponding to the touch input. As another example and not by way of limitation, if the delta change exceeds a first threshold level, the touch state can correspond to a hover touch state. Although this disclosure describes determining a touch state in a particular manner, this disclosure contemplates determining a touch state in any suitable manner.

In particular embodiments, the electronic device may select a touch location prediction method from a plurality of touch location prediction methods. In particular embodiments, the electronic device can use the touch state to select a touch location prediction method. As an example and not by way of limitation, if the touch state is determined to be a hover touch state, then the electronic device can use a touch location prediction method corresponding to a hover touch state. In particular embodiments, the plurality of touch location prediction methods can comprise one or more of a look up table method, a curve fitting method, or a machine learning model method. Although this disclosure describes selecting a touch location prediction method in a particular manner, this disclosure contemplates selecting a touch location prediction method in any suitable manner.

In particular embodiments, the electronic device may determine a predicted touch location of a touch input. In particular embodiments, the electronic device can determine the predicted touch location of the touch input based on the touch location prediction method and the sensor data. As an example and not by way of limitation, if the electronic device determines to use a look up table method, then the electronic device can compare the sensor data received to previously recorded sensor data to determine the predicted touch location of the touch input. Although this disclosure describes determining a predicted touch location of a touch input in a particular manner, this disclosure contemplates determining a predicted touch location of a touch input in any suitable manner.

In particular embodiments, the electronic device may preprocess the sensor data. In particular embodiments, the electronic device may preprocess the sensor data to generate a preprocessed output using one or more of detrending, digital filtering, or windowing. In particular embodiments, the electronic device may transform the preprocessed output into a frequency domain using a frequency extraction algorithm, where the frequency domain may comprise one or more frequency components. In particular embodiments, the electronic device may extract one or more magnitudes of a respective frequency component of the one or more frequency components to generate a power spectral density. In particular embodiments, the electronic device may process the power spectral density with a low pass filter to generate a filtered output. In particular embodiments, the filter output may further be used to determine the predicted touch location of the touch input. Although this disclosure describes preprocessing the sensor data in a particular manner, this disclosure contemplates preprocessing the sensor data in any suitable manner.

Figure 2:
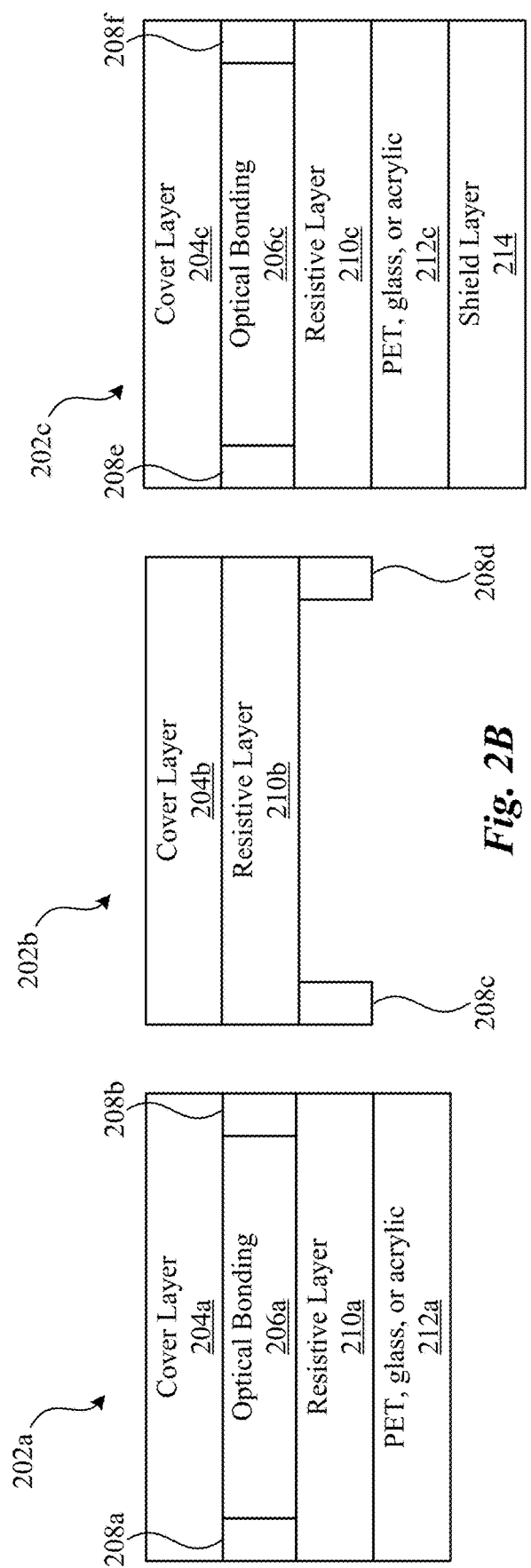
FIGS. 2A-2C illustrate examples of different touch panel structures.

FIGS. 2A-2C illustrate example of different touch panel structures 202a-202c. FIGS. 2A-2C can represent a cross-section of touch panel structures 202a-202c. Referring to FIG. 2A, the touch panel structure 202a can include a cover layer 204a, an optical bonding 206a, electrodes 208a, 208b, resistive layer 210a, and a PET, glass, or acrylic layer 212a. In particular embodiments, the resistive layer 210a can be a single layer of a resistive material that has a range of KΩ to MΩ/sq. In particular embodiments, the resistive layer 210a can be made of a wide range of materials that include one or more of ITO, PEDOT:PSS, etc. In particular embodiments, the resistive layer 210a can be coated on a separate material. In particular embodiments, the electrodes 208a, 208b can electrically connect the resistive layer 210a to the controller. In particular embodiments, the electrodes 208a, 208b can be any conductive material, such as copper, gold, silver, etc. Referring to FIG. 2B, the touch panel structure 202b can include a cover layer 204b, a resistive layer 210b, and electrodes 208c, 208d. In particular embodiments, the resistive layer 208b can be applied directly to the top cover layer 204b. Referring to FIG. 2C, the touch panel structure 202c can include a cover layer 204c, optical bonding 206c, electrodes 208e, 208f, resistive layer 210c, a PET, glass, or acrylic layer 212c, and a shield layer 214. In particular embodiments, the PET, glass, or acrylic layer 212c may be embodied as other materials. In particular embodiments, the touch panel structure 202c can include an optional shield layer 214. The shield layer 214 can improve the signal to noise ratio of the touch panel structure 202c. While a certain configuration of components of each touch panel structure 202a-202c is shown, this disclosure contemplates any combination and arrangement of the components of the components of each touch panel structure 202a-202c. As an example and not by way of limitation, each of the touch panel structures 202a-202c may not have the cover layer 204a-204c.

Figure 3:
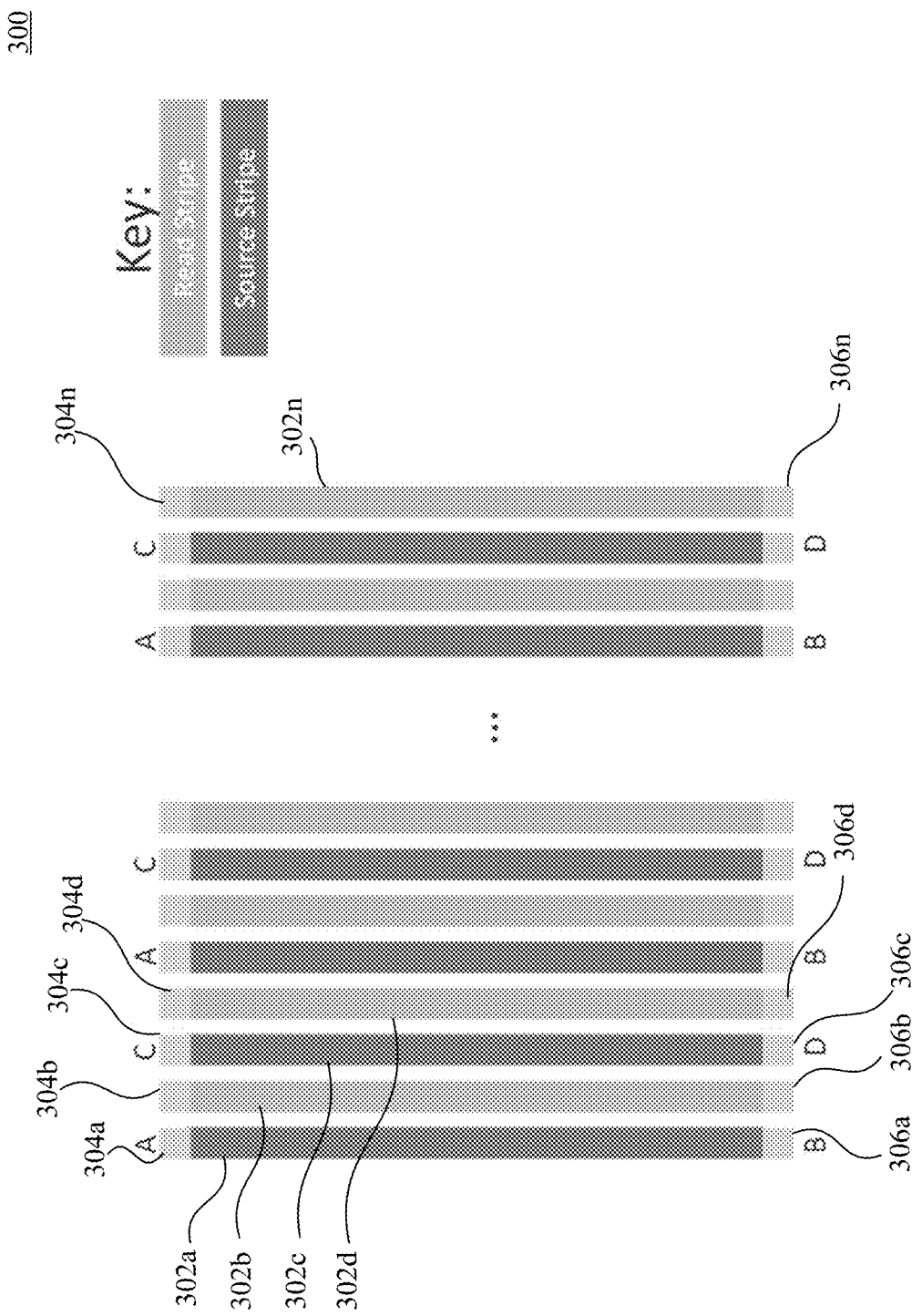
FIG. 3 illustrates an example configuration of a touch panel structure.

FIG. 3 illustrates an example configuration of a touch panel structure 300. In particular embodiments, the touch panel structure 300 can include a plurality of stripes 302a-302n that correspond to a single layer of resistive material (e.g., resistive layers 210a-210c). While the touch panel structure 300 illustrates the stripes 302a-302n as rectangles, the stripes 302a-302n can be patterned as other shapes. In particular embodiments, the touch panel structure 300 can include a plurality of electrode pairs 304a-304n, 306a-306n. In particular embodiments, a controller coupled to the touch panel structure 300 can configure the touch panel structure 300 as shown in FIG. 3. In particular embodiments, the controller can configure the plurality of stripes 302a-302n into a set of read stripes and a set of source stripes. As an example and not by way of limitation, stripes 302a, 302c can be configured into source stripes and stripes 302b, 302d can be configured into read stripes. In particular embodiments, the electrode pairs 304a, 304c and 306a, 306c coupled to the source stripes 302a, 302c can be injected with a plurality of signals, respectively. Each signal injected into each of the electrodes 304a, 304c, 306a, 306c can be a different frequency. In particular embodiments, the configuration of the stripes can repeat as shown in FIG. 3, where electrodes 304 of source stripes are labeled as either A or C and electrodes 306 of source stripes are labeled as either B or D. The same signal can be injected into the same labeled electrode (e.g., electrodes A are injected with the same signal). In particular embodiments, the read stripes of the plurality of stripes 302 are used to measure the signals coupled from the source stripes 302. In particular embodiments, if a touch input (e.g., a user's finger, a stylus, etc.) interfaces the touch panel structure 300, the touch input can attenuate the injected signals and the read stripes can measure the attenuated signals corresponding to the touch input. In particular embodiments, the controller can reconfigure the touch panel structure 300 to switch the read stripes to source stripes and switch the source stripes to read stripes (e.g. time multiplexing). The reconfiguration would inject signals in the newly configured source stripes. In particular embodiments, the pattern of repetition (e.g., A, B, C, D) may not be limited to only four electrodes, but could be any number of electrodes 304, 306. In particular embodiments, each source electrode can inject a signal with a different frequency. In particular embodiments, the variation of frequencies may encode spatial information in the signals, which can be used to improve the accuracy of the touch location prediction algorithm as described herein. While not shown, the touch panel structure 300 can include an analog multiplexer to reduce the ADC hardware complexity. The signals collected by the controller can be multiplexed using the analog multiplexer. In particular embodiments, instead of having a dedicated ADC channel for every single electrode, multiplexing may allow the controller to cycle through different grouping of electrodes 304, 306 to collect a full data point.

Figure 4:
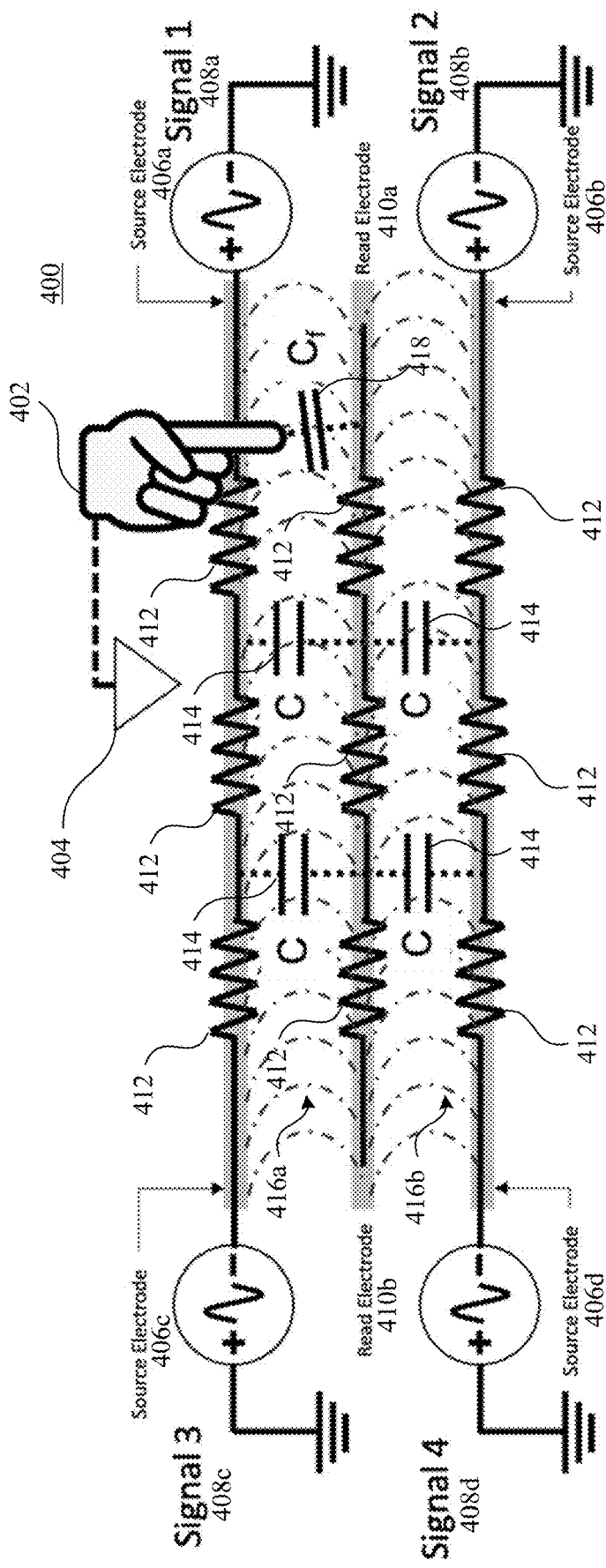
FIG. 4 illustrates an example structure of a touch panel.

FIG. 4 illustrates an example structure 400 of the touch panel. In particular embodiments, a user can touch the structure 400 using a touch input 402, which would create an indirect path to ground 404. The touch input 402 can be a user's finger. In particular embodiments, the structure 400 may include source electrodes 406a-406d, signal generators 408a-408d, and read electrodes 410a-410b. Resistance 412 and capacitance 414 represent the circuit model of the stripes. The electric fields 416a-416b represent the coupling electric field between the stripes. The touch capacitor 418 represents the capacitance between touch input and the stripes. The source electrodes 406a and 406c both injected signals into a stripe and form a source stripe, the read electrodes 410a and 410b read the coupled signal from the adjacent stripes and form a read stripe, and the source electrodes 406b-406d injected signal into a stripe and form a source stripe. The signal variation that is detected when the touch input 402 touches the structure 400 comes from shunting the electric field 416a to the ground through the body. In particular embodiments, there are signals 408a-408d injected into the source electrodes 406a-406d, respectively. These signals are read using read electrodes 410a-410b that are adjacent to the source electrodes 406a-406d. When the structure 400 placed on a display (e.g., TV) it forms a low pass filter that has a cutoff frequency $$f_c = \frac{1}{2\pi RC}$$

where the C represent the equivalent capacitance between the structure and the display. The injected signal frequencies of the signals 408a-408d can be chosen to be around the $f_c$ to increase the sensitivity to the touch input 402. When a touch input 402 touches the stripe at a distance d a new capacitance (touch capacitance) is added to the touch panel 400. The measured signal will be attenuated. The attenuation can be proportional to the distance between the touch input 402 and the read electrode 410. Different signals 408a-408d can be applied to the stripes, which allow detection of the touch input 402 on, left, or right of the reading stripe that comprises the two read electrodes 410a-410b. The signals 408a-408d can each be a single or multiple frequencies.

In particular embodiments, the touch capacitance 418 can vary with touch pressure, finger area, and the like. The measured signals at the read electrodes 410a-410b can be normalized to eliminate the variations in capacitive effects. As shown in FIG. 4, since the touch input 402 is located in a touch location between the sourcing stripe (that comprises the two source electrodes 406a, 406c) and the reading stripe, the measured signal (e.g., signal 408a) will be attenuated more than the other signals 408b, 408d. As a result of the attenuated measured signal (e.g., signal 408a), a set of detected coordinates of the touch input 402 can be determined in between the reading stripe and the sourcing stripe. In particular embodiments, the signal frequencies of the signals 408a-408d may be chosen to be into two different bands (low and high). The attenuations in low frequency signals can be detected by electrodes that are further from the sourcing electrodes, while the high frequency signals can have higher sensitivity at shorter distances from electrodes. In particular embodiments, the capacitance 418 can have a higher capacitance than the other capacitance 414 in the touch panel 400. While only one touch input 402 is shown, there may be multiple touch inputs 402 interfacing the touch panel 400 at any given time, each touch input 402 affecting the electric field 416 and the resulting measured signal.

Figure 5:
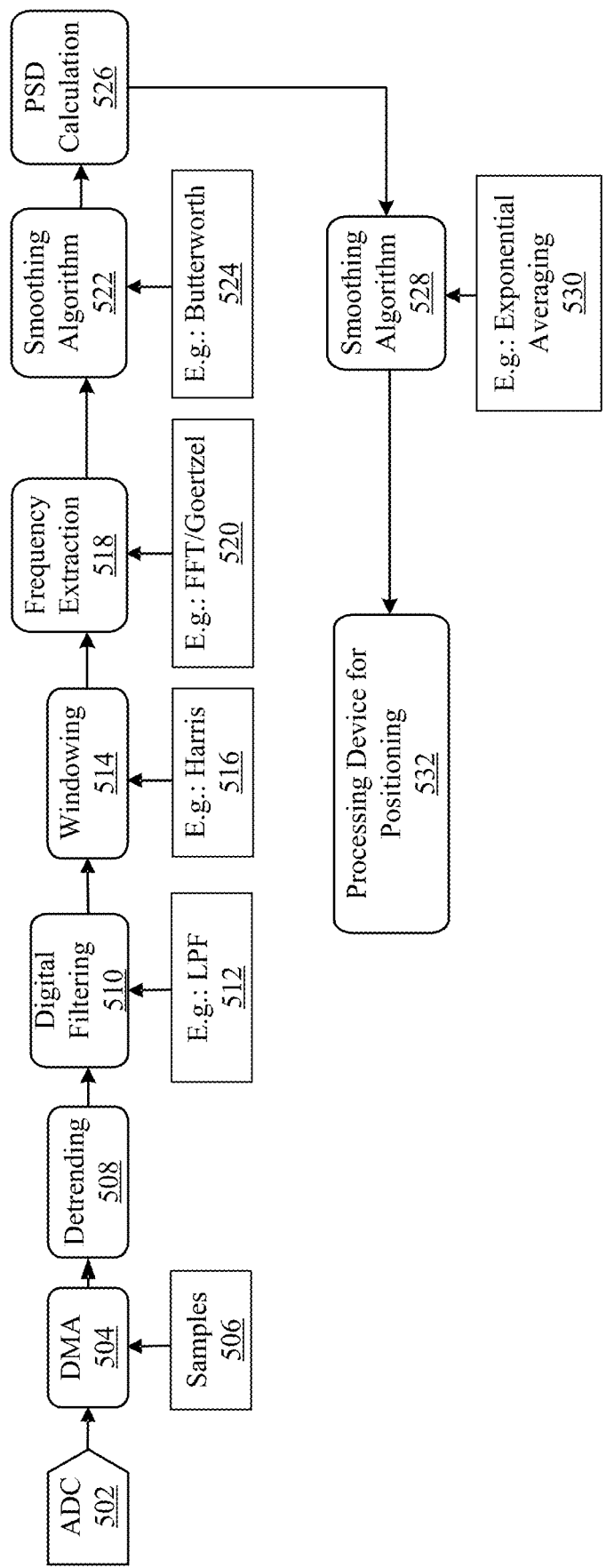
FIG. 5 illustrates an example process flow of measuring signals of a touch panel.

FIG. 5 illustrates an example process 500 flow of measuring signals of a touch panel. In particular embodiments, an electronic device can perform the process 500. The electronic device can comprise a controller and analog front-end circuit coupled to a touch panel. In particular embodiments, the electronic device may use the controller (not shown) to perform the process 500. The process 500 may start at step 502 where the data is collected using an analog to digital converter (ADC) to receive data from an analog front-end (not shown). At step 504, the ADC data is moved to the memory using Direct Memory Access (DMA) when sample size (e.g. 2048 samples 506) is reached. Detrending 508 can be performed on the collected data samples. At step 510, digital filtering can be performed (e.g. low pass filtering 512). At step 514, windowing can be performed using one of the windowing functions (e.g. Harris function 516). At step 518, frequency extraction can be performed to transform the data into the frequency domain using a frequency extraction algorithm, such as FFT/Goertzel 520. At step 522, a smoothing algorithm can be performed on FFT data, such as Butterworth filtering 524. At step 526, power spectral density (PSD) calculation can be performed where the magnitudes of the target (sourced) frequencies are extracted into the power spectral density representation of the signals. At step 528, another smoothing algorithm can be used on the PSD data, such as an exponential averaging 530. At step 532, the result can be sent to a processing device (e.g., a controller) for positioning.

Figure 6:
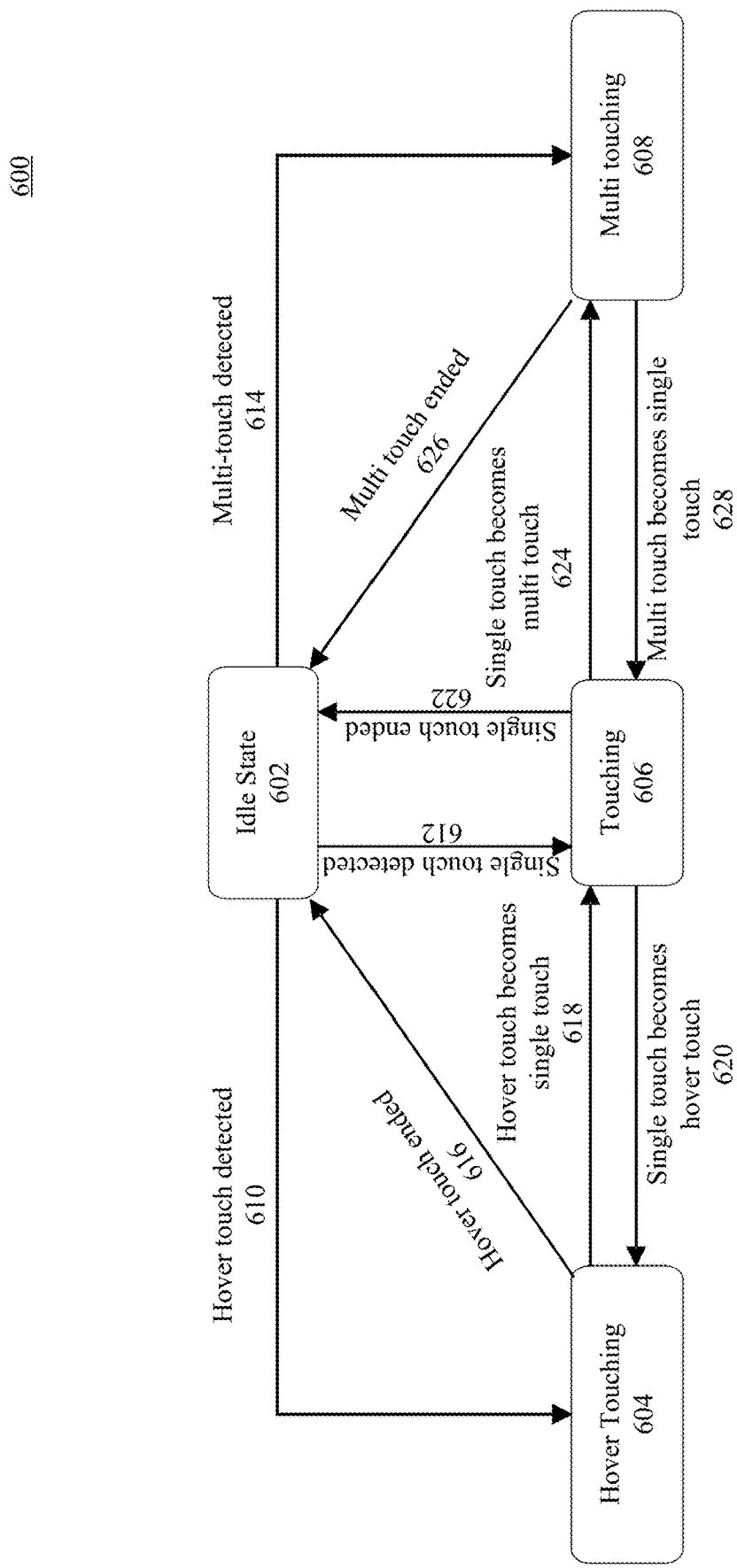
FIG. 6 illustrates an example process flow of state determination of a touch panel.

FIG. 6 illustrates an example process 600 flow of state determination of a touch panel. The process 600 illustrates the transitions between the different possible touch states of the touch panel. In particular embodiments, a touch panel may start at an idle state 602. The controller coupled to the touch panel can measure signals and determine a touch state. From the idle state 602, the touch panel state can transition to a hover touching state 604 when a hover touch is detected 610. From the idle state 602, the touch panel state can transition to a touching state 606 when a single touch is detected 612. From the idle state 602, the touch panel state can transition to a multi touching state 608 when a multi touch is detected 614. From the hover touching state 604, the touch panel state can transition to an idle state 602 when the hover touch ends 616. From the hover touching state 604, the touch panel state can transition to a touching state 606 when the hover touch becomes a single touch 618. From the touching state 606, the touch panel state can transition to a hover touching state 604 when the single touch becomes a hover touch 620. From the touching state 606, the touch panel state can transition to an idle state 602 when the single touch ends 622. From the touching state 606, the touch panel state can transition to a multi touching state 608 when the single touch becomes a multi touch 624. From the multi touching state 608, the touch panel state can transition to an idle state 602 when the multi touching ends 626. From the multi touching state 608, the touch panel state can transition to a touching state 606 when the multi touching becomes a single touch 628.

Figure 7:
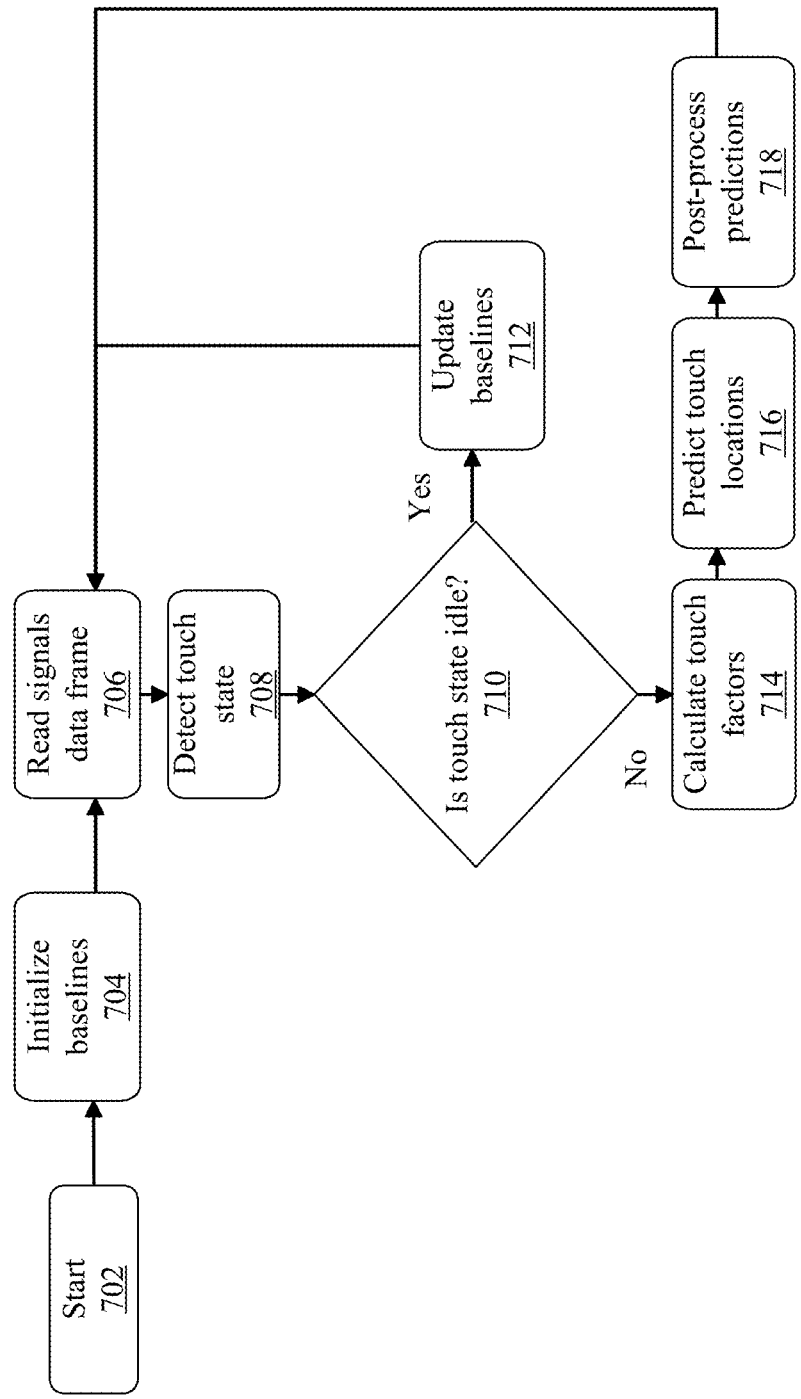
FIG. 7 illustrates an example process flow of touch detection of a touch panel.

FIG. 7 illustrates an example process 700 flow of touch detection of a touch panel. In particular embodiments, an electronic device can perform the process 700. The electronic device can comprise a controller coupled to a touch panel. The process 700 can start at step 702. At step 704, an electronic device can initialize baselines. As an example and not by way of limitation, the electronic device can access baselines of signal data of the touch panel. At step 706, the electronic device can read signals data frame. As an example and not by way of limitation, the electronic device can measure the signals from the touch panel. At step 708, the electronic device can detect a touch state. As an example and not by way of limitation, the electronic device can compare the read signals to the baseline signal data to detect the touch state. At step 710, the electronic device can determine whether the touch state is idle, or in a no-touch status. In particular embodiments, the electronic device can determine whether the read signals compared to the baseline signal data exceeds a threshold level. As an example and not by way of limitation, the electronic device can determine a delta change between the read signals and the baseline signal data and determine whether the delta change exceeds a threshold level. If the touch state is determined to be an idle state, then at step 712, the electronic device can update the baselines. If the touch state is determined to not be an idle state, then at step 714, the electronic device can calculate touch factors. At step 716, the electronic device can predict touch locations. As an example and not by way of limitation, the electronic device can use a touch location prediction method to determine a predicted touch location. At step 718, the electronic device can post-process the predicted touch locations. As an example and not by way of limitation, the electronic device can send the predicted touch locations to an output device to be displayed. After step 712 and step 718, the process 700 can return to step 706 to continue reading signals.

Figure 8:
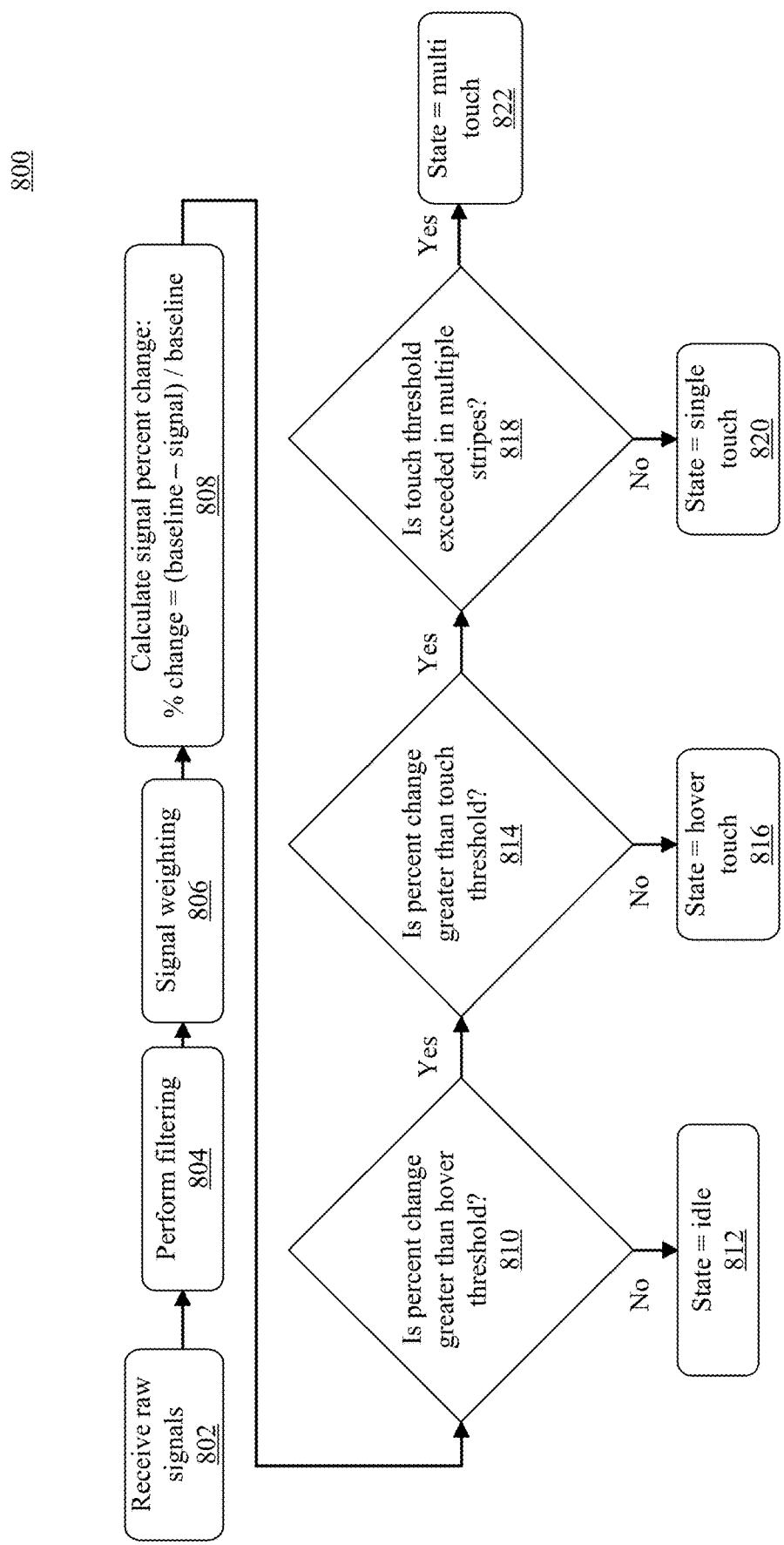
FIG. 8 illustrates an example process flow of a touch state detection algorithm of a touch panel.

FIG. 8 illustrates an example process 800 flow of a touch state detection algorithm of a touch panel. The process 800 can be used to determine the touch state of the touch panel. In particular embodiments, an electronic device can perform the process 800. The electronic device can comprise a controller coupled to a touch panel. The process 800 can start at step 802, where an electronic device may receive raw signals 802. At step 804, the electronic device can perform filtering on the raw signals. At step 806, the electronic device can perform signal weighting. At step 808, the electronic device can calculate a signal percent change using the algorithm, % change=(baseline−signal)/baseline. In particular embodiments, the baseline of a signal can be a low pass filtered version of the signal that does not update during touches. At step 810, the electronic device can determine whether the percent change is greater than the hover threshold. If the percent change is not greater than the hover threshold, the electronic device can determine the touch state is an idle state 812. If the percent change is greater than the hover threshold, then the process 800 continues to step 814 where the electronic device can determine whether the percent change is greater than the touch threshold. If the percent change is not greater than the touch threshold, the electronic device can determine the touch state is a hover state 816. If the percent change is greater than the touch threshold, then the process 800 continues to step 818 where the electronic device can determine whether the touch threshold is exceeded in multiple stripes. If the touch threshold is not exceeded in multiple stripes, the electronic device can determine the touch state is a single touch state 820. If the touch threshold is exceeded in multiple stripes, the electronic device can determine the touch state is a multi touch state.

Figure 9:
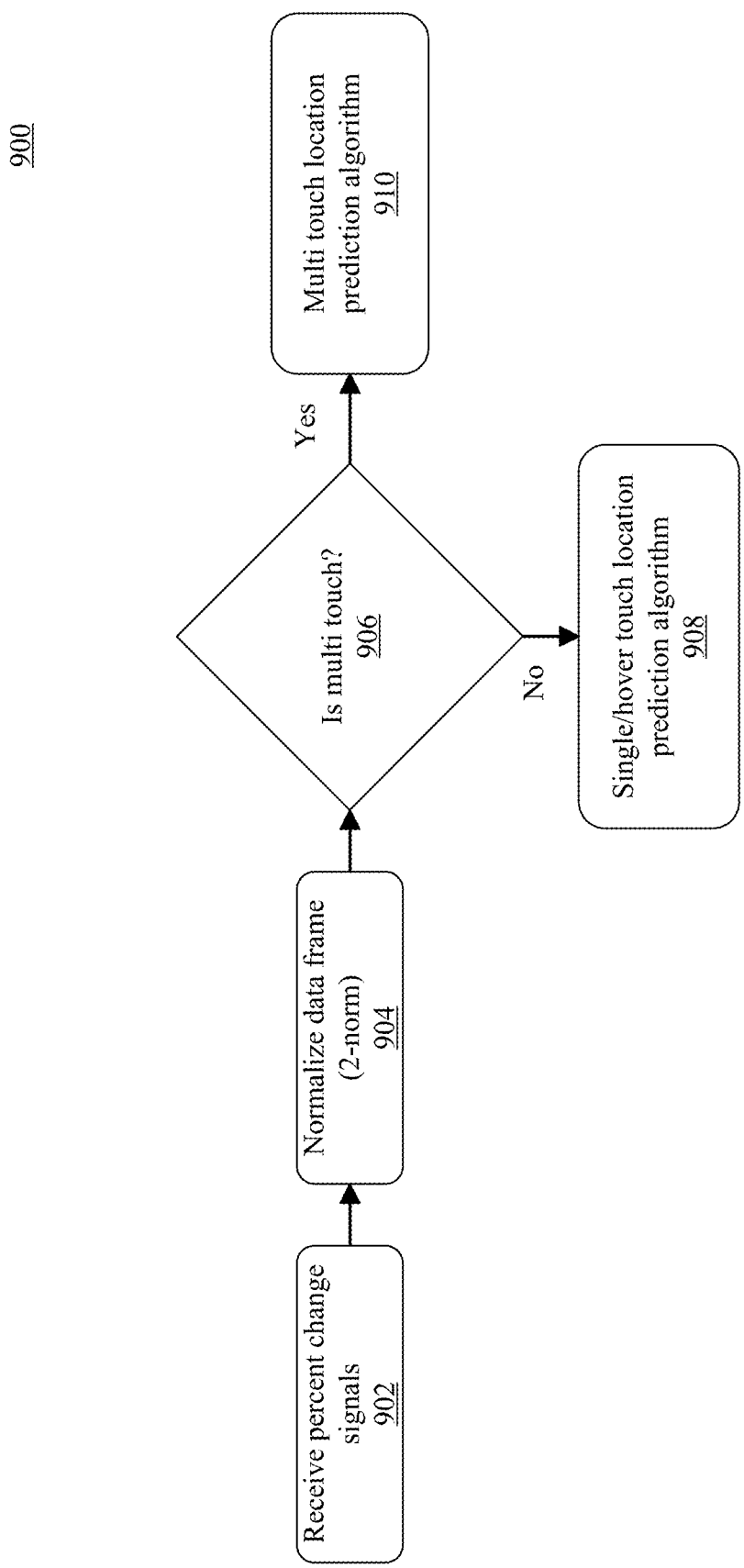
FIG. 9 illustrates an example process flow of a touch location detection algorithm of a touch panel.

FIG. 9 illustrates an example process 900 flow of a touch location detection algorithm of a touch panel. In particular embodiments, an electronic device can perform the process 900. The electronic device can comprise a controller coupled to a touch panel. In particular embodiments, the process 900 can occur after a touch state is detected as shown in process 800. The process 900 can start at step 902, where an electronic device can receive percent change signals. The percent change signals can be received as a percent change vector. At step 904, the electronic device can normalize the percent change signals. At step 906, the electronic device can determine whether the touch state was a multi touch state. If the touch state is not a multi touch state, then the process 900 continues to step 908, where the electronic device can use a single/hover touch location prediction algorithm to determine a predicted touch location based on the normalized percent change signals. If the touch state is a multi touch state, then the process 900 continues to step 910, where the electronic device can use a multi touch location prediction algorithm to determine a predicted touch location based on the normalized percent change signals.

In particular embodiments, a single touch location prediction method or a hover touch location prediction method may include a look up table, a curve fitting method, or a machine learning method. In particular embodiments, touching a screen (e.g., a touch panel) can create an attenuation of the signals measured. The amount that each signal is attenuated can correspond to the location of the touch. As a result, the signals may be a 'fingerprint' of the touch location. In the lookup table method, the fingerprints for a grid of known points can be collected. When predicting the touch location, then the controller may calculate the most similar fingerprint. The similarity function can be a number of different methods, including Euclidean distance, angle between vectors, etc. The grid of known points can be interpolated to get a finer resolution grid.

In particular embodiments, detecting which stripe is touched can be relatively easy, and can be achieved by detecting the stripe with the highest percent change in the signals measured. Curve fitting can be a method that can be used to detect the position touched within the stripe, by looking at a subset of signals or a linear combination of signals within the stripe (meaning both electrodes corresponding to the stripe). A resulting curve from subtracting the signals of one electrode in the stripe from the other can be determined. Since this is a non-increasing monotonic function, a curve (polynomial, sigmoidal, etc.) curve can be fit to the data and used to predict the location in the stripe in real time. Similarly, other combinations of signals can be developed and modelled using this method.

In particular embodiments, the input to machine learning models may be the normalized signals data, and the output can be an x, y position. Some machine learning methods that can be used includes neural networks, LASSO regression, ridge regression, support vector machines, support vector regressors, decision trees, random forests, linear models, and the like.

In particular embodiments, a multi touch location prediction algorithm can include similar methods as a single touch location prediction algorithm. However, the methods used for a single touch location prediction algorithm may need to be adjusted to support two or more touch prediction targets. In particular embodiments, the electrode signals can change drastically between a single touch and a multi touch.

In particular embodiments, training and validation data may be required when implementing the touch prediction method. There may be many approaches to collect training data, including many variations in data collection density, touch locations, and method of activation. One approach may be to use a robot with a faux finger attachment to touch the screen in known locations. The robot can be programmed to touch these locations precisely. Another method may be to display an image of touch locations on an underlying display panel and to manually touch the displayed points in a known order. While robotic calibrations are useful for factory calibration, additional methods can also include user calibration. User calibration can include touching the center of the screen or a set of points to tune the prediction algorithm parameters. User calibration can also be an auto-calibration that happens when the user attempts to press buttons on a screen (e.g., touch panel). Every time the user presses a button or known visual item on the screen, a small correction can be applied to the parameters to automatically calibrate the touch panel with no additional user input. In particular embodiments, manual calibration methods can include one or more of user touching grid of points, user sliding finger down stripe, user sliding finger across stripes, user touching points generated on the screen by a controller coupled to a touch panel, user drawing a circle, and a user sliding a finger from one corner to the opposite corner. In particular embodiments, automatic calibration can include one or more of robotic finger touching grid of points, robotic finger drawing shapes, system auto-calibrating when the user touches obvious targets, system performing temperature correction, system performing no-touch noise analysis to cancel environmental noise, system can self-adapt based on common difference of click offsets from the user while regular use (i.e. boundary box of the button vs actual clicks of the users).

In particular embodiments, after obtaining one (or more) predicted x,y coordinates from any of the previous touch detection pipelines, the software processing pipeline may optionally include post-processing steps. Such steps can include filtering (e.g., moving average filter, exponential average filter, Kalman filter, etc.) for smoothing out the predicted touch point movement, jitter reduction (only updating the predicted touch location when the new touch location is greater than a certain distance threshold away from the current predicted touch location), and frame skipping at the beginning of a touch (which prevents some hover touches from being detected as real touches).

Figure 10:
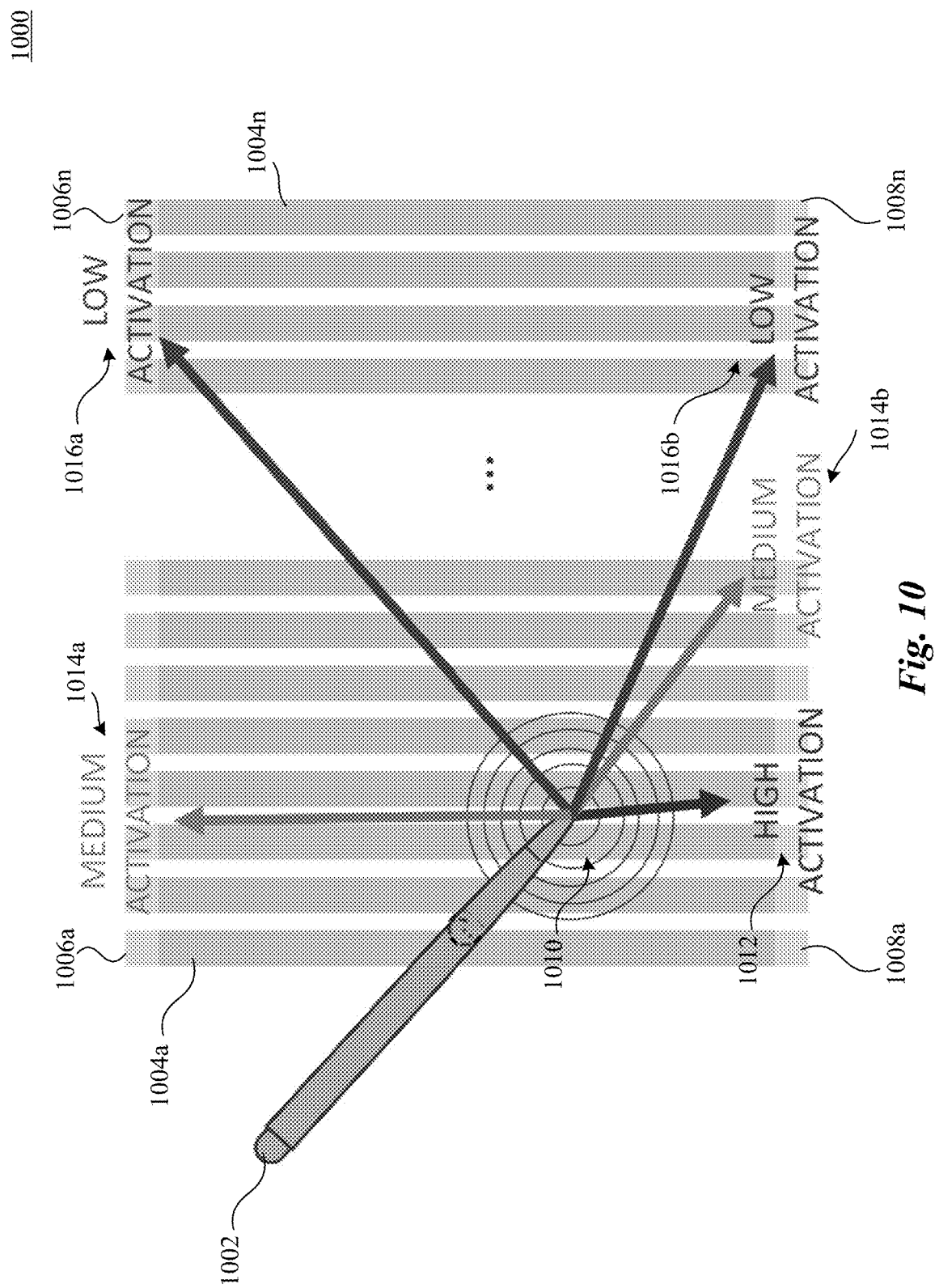
FIG. 10 illustrates an example interaction between a touch panel and an active pen.

FIG. 10 illustrates an example interaction between a touch panel 1000 and an active pen 1002. In particular embodiments, the touch panel 1000 can comprise a plurality of stripes 1004*a*-1004*n* and a plurality of electrode pairs 1006*a*-1006*n* and 1008*a*-1008*n*. In particular embodiments, a controller coupled to the touch panel 1000 can configure the stripes 1004*a*-1004*n* to be read stripes. In particular embodiments, the controller coupled to the touch panel 1000 can configure the stripes 1004*a*-1004*n* and electrodes 1006*a*-1006*n* and 1008*a*-1008*n* similarly to touch panel structure 300. In particular embodiments, the active pen 1002 can inject a frequency 1010 separate from the sourcing electrodes. The frequency 1010 can be uniquely detected and attributed to the presence of the active pen 1002. Once the injected frequency 1010 from the active pen 1002 is detected by the read stripes, all of the stripes 1004*a*-1004*n* can go into read mode to get the most accurate pen data from the active pen 1002. The active pen 1002 can inject this frequency 1010, and the stripes closest to the point where the active pen 1002 touches the touch panel 1000 will have the highest level of signal activation 1012. The stripes a moderate distance from the point where the active pen 1002 touches the touch panel 1000 will have a medium level of signal activation 1014*a*, 1014*b*. The stripes furthest away from the point where the active pen 1002 touches the touch panel 1000 will have a low level of signal activation 1016*a*, 1016*b*. The touch prediction algorithm used may be similar to a look up table method, but rather than looking at the relative levels of signal attenuation measured at each sensor, the relative magnitudes of the measured injected pen frequency 1010 may be used instead.

Figure 11:
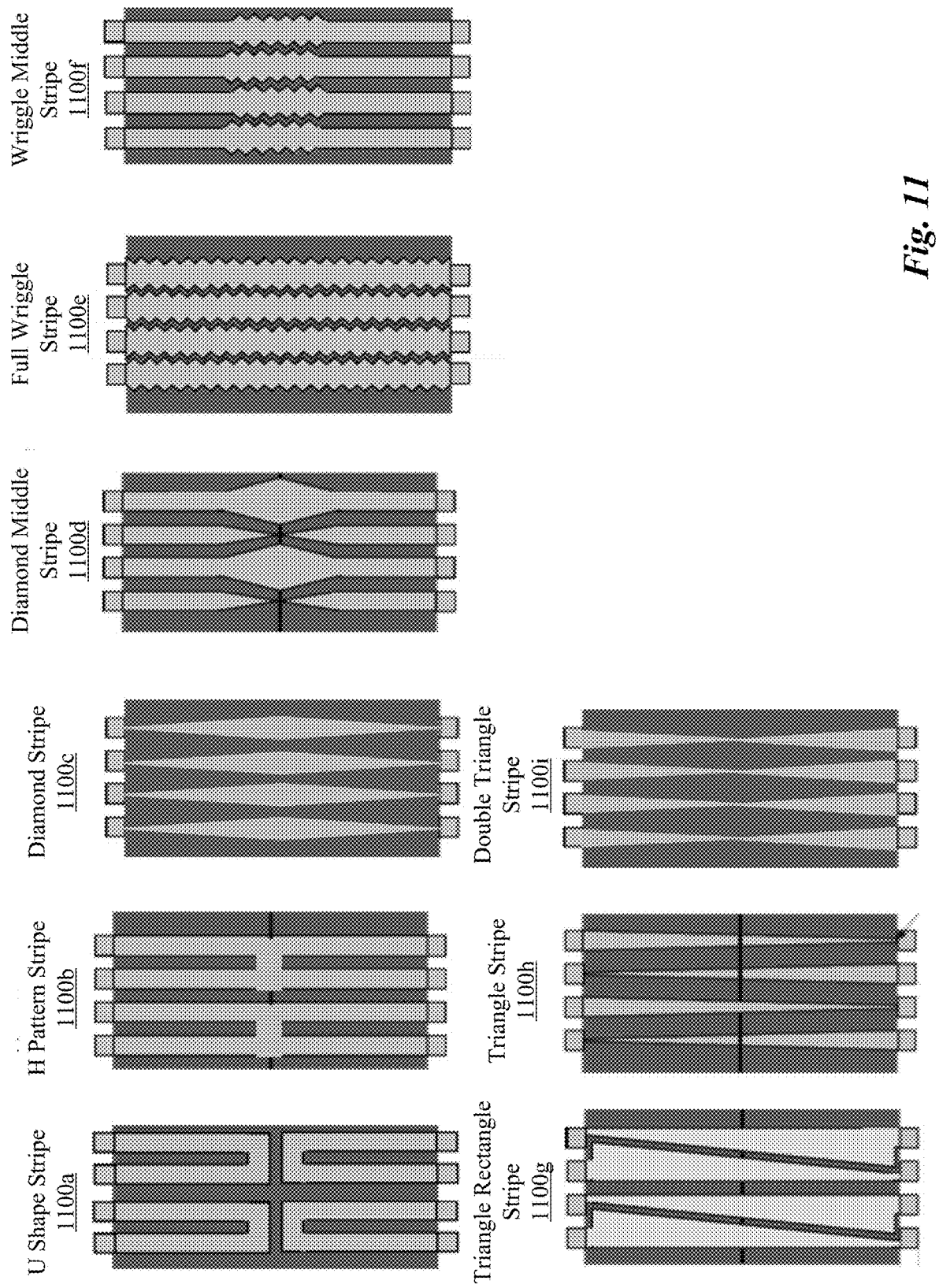
FIG. 11 illustrates example pattern configurations of sensors of a touch panel.

FIG. 11 illustrates example pattern configurations 1100a-1100i of stripes of a touch panel. The example pattern configurations 1100a-1100i can include one or more of a U shape stripe pattern 1100a, a H pattern stripe 1100b, a diamond stripe pattern 1100c, a diamond middle stripe pattern 1100d, a full wriggle stripe 1100e, a wriggle middle stripe pattern 1100f, a triangle rectangle stripe pattern 1100g, a triangle stripe pattern 1100h, and a double triangle stripe pattern 1100i.

Figure 12:
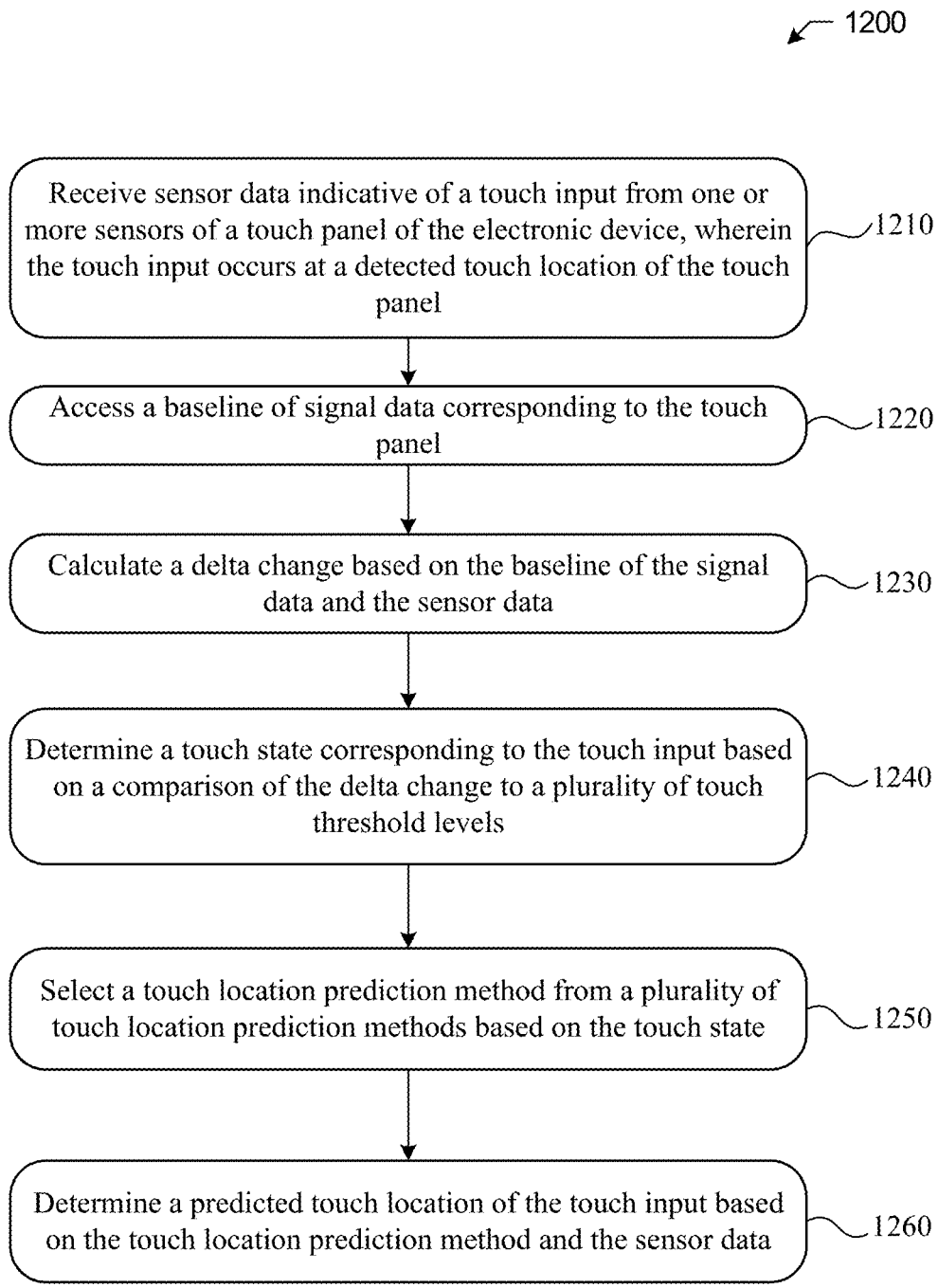
FIG. 12 illustrates an example method for determining a predicted touch location of a touch input.

FIG. 12 illustrates is a flow diagram of a method 1200 for determining a set of predicted coordinates of a touch input, in accordance with the presently disclosed embodiments. The method 1200 may be performed utilizing one or more processing devices (e.g., electronic device coupled with a prediction system 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing data, software (e.g., instructions running/executing on one or more processors), firmware (e.g., microcode), or some combination thereof.

The method 1200 may begin at step 1210 with the one or more processing devices (e.g., electronic device coupled with prediction system 100) receiving sensor data indicative of a touch input from one or more sensors of a touch panel of the electronic device. For example, in particular embodiments, the touch input may occur at a detected touch location of the touch panel. The method 1200 may then continue at step 1220 with the one or more processing devices (e.g., electronic device coupled with prediction system 100) accessing a baseline of signal data corresponding to the touch panel. The method 1200 may then continue at step 1230 with the one or more processing devices (e.g., electronic device coupled with prediction system 100) calculating a delta change based on the baseline of the signal data and the sensor data. The method 1200 may then continue at step 1240 with the one or more processing devices (e.g., electronic device coupled with prediction system 100) determining a touch state corresponding to the touch input based on a comparison of the delta change to a plurality of touch threshold levels. The method 1200 may then continue at step 1250 with the one or more processing devices (e.g., electronic device coupled with prediction system 100) selecting a touch location prediction method from a plurality of touch location prediction methods based on the touch state. The method 1200 may then continue at step 1260 with the one or more processing devices (e.g., electronic device coupled with prediction system 100) determining a predicted touch location of the touch input based on the touch location prediction method and the sensor data. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for determining a predicted touch location of a touch input including the particular steps of the method of FIG. 12, this disclosure contemplates any suitable method for determining a predicted touch location of a touch input including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Systems and Methods

Figure 13:
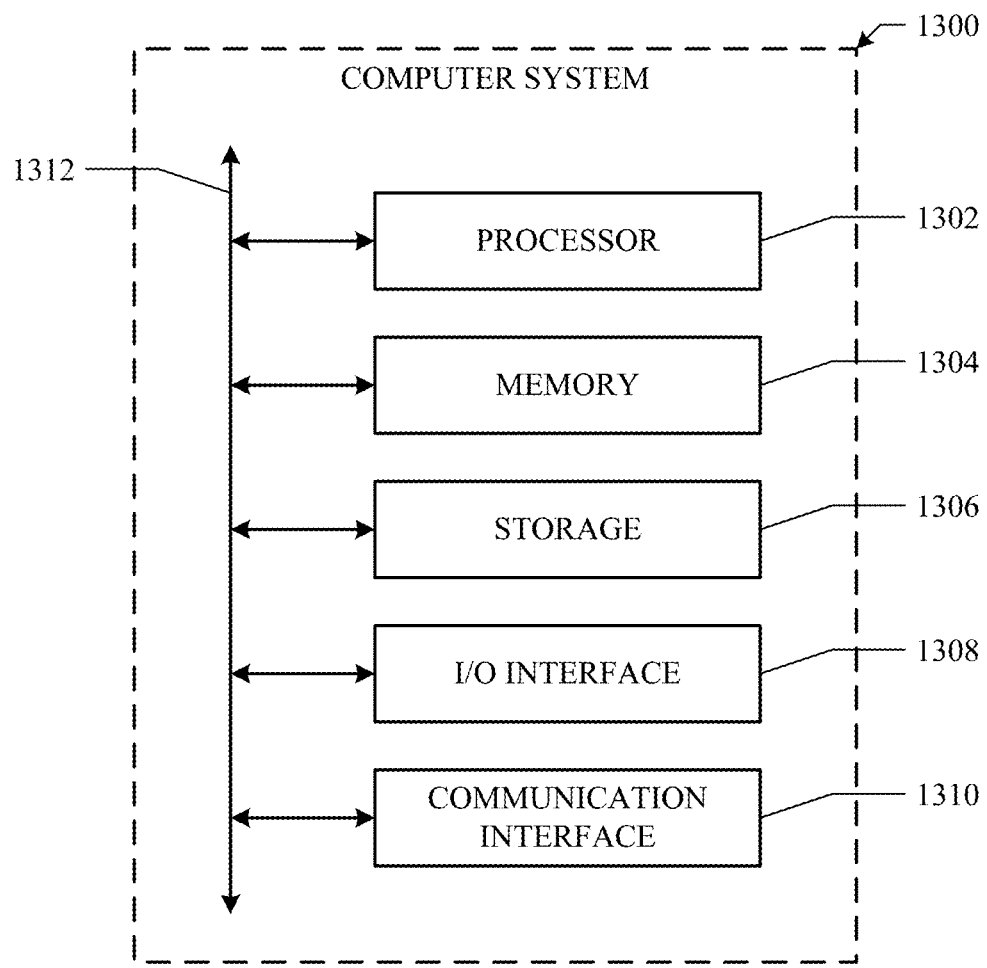
FIG. 13 illustrates an example computer system.

FIG. 13 illustrates an example computer system 1300 that may be utilized to perform determining a predicted touch location of a touch input, in accordance with the presently disclosed embodiments. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks.

Where appropriate, one or more computer systems 1300 may perform without substantial spatial or temporal limitation one or more steps of one or more methods described or illustrated herein. As an example, and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement. In particular embodiments, processor 1302 includes hardware for executing instructions, such as those making up a computer program. As an example, and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example, and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302.

Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example, and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere).

One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memory devices 1304, where appropriate. Although this disclosure describes and illustrates particular memory, this disclosure contemplates any suitable memory.

In particular embodiments, storage 1306 includes mass storage for data or instructions. As an example, and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1306 for them. Where appropriate, I/O interface 1308 may include one or more device or software drivers enabling processor 1302 to drive one or more of these I/O devices. I/O interface 1308 may include one or more I/O interfaces 1306, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it.

As an example, and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example, and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

AI Architecture

Figure 14:
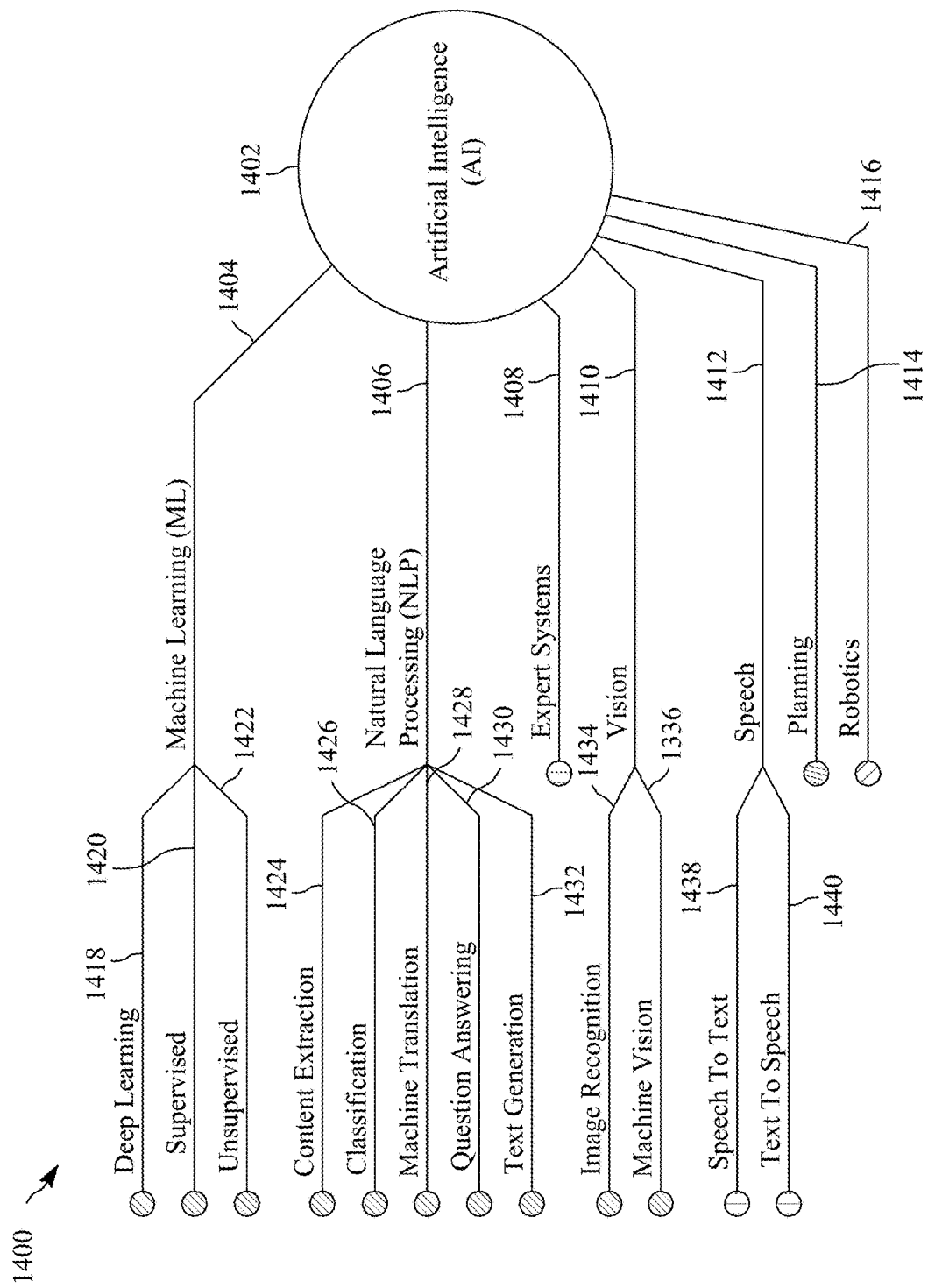
FIG. 14 illustrates a diagram of an example artificial intelligence (AI) architecture.

FIG. 14 illustrates a diagram 1400 of an example artificial intelligence (AI) architecture 1402 that may be utilized to perform determining a set of predicted coordinates of a touch input, in accordance with the presently disclosed embodiments. In particular embodiments, the AI architecture 1402 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 14, the AI architecture 1402 may include machine leaning (ML) algorithms and functions 1404, natural language processing (NLP) algorithms and functions 1406, expert systems 1408, computer-based vision algorithms and functions 1410, speech recognition algorithms and functions 1412, planning algorithms and functions 1414, and robotics algorithms and functions 1416. In particular embodiments, the ML algorithms and functions 1404 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 1404 may include deep learning algorithms 1418, supervised learning algorithms 1420, and unsupervised learning algorithms 1422.

In particular embodiments, the deep learning algorithms 1418 may include any artificial neural networks (ANNs) that may be utilized to learn deep levels of representations and abstractions from large amounts of data. For example, the deep learning algorithms 1418 may include ANNs, such as a multilayer perceptron (MLP), an autoencoder (AE), a convolution neural network (CNN), a recurrent neural network (RNN), long short term memory (LSTM), a gated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 1420 may include any algorithms that may be utilized to apply, for example, what has been learned in the past to new data using labeled examples for predicting future events. For example, starting from the analysis of a known training dataset, the supervised learning algorithms 1420 may produce an inferred function to make predictions about the output values. The supervised learning algorithms 1420 can also compare its output with the correct and intended output and find errors in order to modify the supervised learning algorithms 1420 accordingly. On the other hand, the unsupervised learning algorithms 1422 may include any algorithms that may applied, for example, when the data used to train the unsupervised learning algorithms 1422 are neither classified or labeled. For example, the unsupervised learning algorithms 1422 may study and analyze how systems may infer a function to describe a hidden structure from unlabeled data.

In particular embodiments, the NLP algorithms and functions 1406 may include any algorithms or functions that may be suitable for automatically manipulating natural language, such as speech and/or text. For example, in particular embodiments, the NLP algorithms and functions 1406 may include content extraction algorithms or functions 1424, classification algorithms or functions 1426, machine translation algorithms or functions 1428, question answering (QA) algorithms or functions 1430, and text generation algorithms or functions 1432. In particular embodiments, the content extraction algorithms or functions 1424 may include a means for extracting text or images from electronic documents (e.g., webpages, text editor documents, and so forth) to be utilized, for example, in other applications.

In particular embodiments, the classification algorithms or functions 1426 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 1428 may include any algorithms or functions that may be suitable for automatically converting source text in one language, for example, into text in another language. The QA algorithms or functions 1430 may include any algorithms or functions that may be suitable for automatically answering questions posed by humans in, for example, a natural language, such as that performed by voice-controlled personal assistant devices. The text generation algorithms or functions 1432 may include any algorithms or functions that may be suitable for automatically generating natural language texts.

In particular embodiments, the expert systems 1408 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 1410 may include any algorithms or functions that may be suitable for automatically extracting information from images (e.g., photo images, video images). For example, the computer-based vision algorithms and functions 1410 may include image recognition algorithms 1434 and machine vision algorithms 1436. The image recognition algorithms 1434 may include any algorithms that may be suitable for automatically identifying and/or classifying objects, places, people, and so forth that may be included in, for example, one or more image frames or other displayed data. The machine vision algorithms 1436 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 1412 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 1438 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 1440 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electronic device:
   receiving sensor data indicative of a touch input from one or more sensors of a touch panel of the electronic device, wherein the touch input occurs at a detected touch location of the touch panel;
   accessing a baseline of signal data corresponding to the touch panel;
   calculating a delta change based on the baseline of the signal data and the sensor data;

determining a touch state corresponding to the touch input based on a comparison of the delta change to a plurality of touch threshold levels, wherein:
    the determined touch state is one of a set of touch states comprising a non-touch event, a hover event, and a touch event; and
    the touch threshold levels are arranged such that:
        when the delta change is less than a first touch threshold level, then the determined touch state is the non-touch event;
        when the delta change is greater than the first touch threshold level and less than a second touch threshold level, then the determined touch state is the hover event; and
        when the delta change is greater than the second touch threshold level, then the determined touch state is the touch event;
selecting, based on the determined touch state, a specific touch location prediction method from a plurality of available touch location prediction methods for the determined touch state; and
determining a predicted touch location of the touch input based on the touch location prediction method and the sensor data.

2. The method of claim 1, wherein the touch panel comprises a plurality of sensors, and wherein the plurality of sensors are positioned in a pattern on the touch panel where a first subset of sensors are configured as source sensors and a second subset of sensors are configured as read sensors.

3. The method of claim 2, wherein the pattern comprises one or more of a stripe pattern, a U-shaped stripe pattern, an H-shaped stripe pattern, a diamond-stripe pattern, a diamond-middle-stripe pattern, a full-wriggle-stripe pattern, a wriggle-middle-stripe pattern, a triangle-rectangle-stripe pattern, a triangle-stripe pattern, or a double-triangle-stripe pattern.

4. The method of claim 2, further comprising:
injecting a plurality of signals into one or more of the source sensors, wherein the plurality of signals comprise at least a first signal at a first frequency and a second signal at a second frequency; and
detecting, by one or more of the read sensors, a plurality of attenuated measured signals based on the touch input interfacing the plurality of signals, wherein the plurality of attenuated measured signals are used to generate the sensor data.

5. The method of claim 2, further comprising:
switching the first subset of sensors to be configured as read sensors and the second subset of sensors to be configured as source sensors at a predetermined frequency, wherein the sensor data includes data from a plurality of attenuated measured signals based on the touch input interfacing a plurality of injected signals that are injected to each of the source sensors.

6. The method of claim 1, wherein the plurality of available touch location prediction methods comprises one or more of a look up table method, a curve fitting method, or a machine learning model method.

7. The method of claim 1, further comprising:
preprocessing the sensor data to generate a preprocessed output using one or more of detrending, digital filtering, or windowing;
transforming the preprocessed output into a frequency domain using a frequency extraction algorithm, wherein the frequency domain comprises one or more frequency components;
extracting one or more magnitudes of a respective frequency component of the one or more frequency components to generate a power spectral density; and
processing the power spectral density with a low pass filter to generate a filtered output, wherein the filter output is further used to determine the predicted touch location of the touch input.

8. An electronic device comprising:
one or more touch panels;
one or more non-transitory computer-readable storage media including instructions; and
one or more processors coupled to the storage media, the one or more processors configured to execute the instructions to:
    receive sensor data indicative of a touch input from one or more sensors of a touch panel of the one or more touch panels of the electronic device, wherein the touch input occurs at a detected touch location of the touch panel;
    access a baseline of signal data corresponding to the touch panel;
    calculate a delta change based on the baseline of the signal data and the sensor data;
    determine a touch state corresponding to the touch input based on a comparison of the delta change to a plurality of touch threshold levels, wherein:
        the determined touch state is one of a set of touch states comprising a non-touch event, a hover event, and a touch event; and
        the touch threshold levels are arranged such that:
            when the delta change is less than a first touch threshold level, then the determined touch state is the non-touch event;
            when the delta change is greater than the first touch threshold level and less than a second touch threshold level, then the determined touch state is the hover event; and
            when the delta change is greater than the second touch threshold level, then the determined touch state is the touch event;
    select, based on the determined touch state, a specific touch location prediction method from a plurality of available touch location prediction methods for the determined touch state; and
    determine a predicted touch location of the touch input based on the touch location prediction method and the sensor data.

9. The electronic device of claim 8, wherein the touch panel comprises a plurality of sensors, and wherein the plurality of sensors are positioned in a pattern on the touch panel where a first subset of sensors are configured as source sensors and a second subset of sensors are configured as read sensors.

10. The electronic device of claim 9, wherein the pattern comprises one or more of a stripe pattern, a U-shaped stripe pattern, an H-shaped stripe pattern, a diamond-stripe pattern, a diamond-middle-stripe pattern, a full-wriggle-stripe pattern, a wriggle-middle-stripe pattern, a triangle-rectangle-stripe pattern, a triangle-stripe pattern, or a double-triangle-stripe pattern.

11. The electronic device of claim 9, wherein the processors are further configured to execute the instructions to:
inject a plurality of signals into one or more of the source sensors, wherein the plurality of signals comprise at least a first signal at a first frequency and a second signal at a second frequency; and detect, by one or more of the read sensors, a plurality of attenuated measured signals based on the touch input interfacing the plurality of signals, wherein the plurality of attenuated measured signals are used to generate the sensor data.

12. The electronic device of claim 9, wherein the processors are further configured to execute the instructions to:
switch the first subset of sensors to be configured as read sensors and the second subset of sensors to be configured as source sensors at a predetermined frequency, wherein the sensor data includes data from a plurality of attenuated measured signals based on the touch input interfacing a plurality of injected signals that are injected to each of the source sensors.

13. The electronic device of claim 8, wherein the plurality of available touch location prediction methods comprises one or more of a look up table method, a curve fitting method, or a machine learning model method.

14. The electronic device of claim 8, wherein the processors are further configured to execute the instructions to:
preprocess the sensor data to generate a preprocessed output using one or more of detrending, digital filtering, or windowing;
transform the preprocessed output into a frequency domain using a frequency extraction algorithm, wherein the frequency domain comprises one or more frequency components;
extract one or more magnitudes of a respective frequency component of the one or more frequency components to generate a power spectral density; and
process the power spectral density with a low pass filter to generate a filtered output, wherein the filter output is further used to determine the predicted touch location of the touch input.

15. A computer-readable non-transitory storage media comprising instructions executable by a processor to:
receive sensor data indicative of a touch input from one or more sensors of a touch panel of the electronic device, wherein the touch input occurs at a detected touch location of the touch panel;
access a baseline of signal data corresponding to the touch panel;
calculate a delta change based on the baseline of the signal data and the sensor data;
determine a touch state corresponding to the touch input based on a comparison of the delta change to a plurality of touch threshold levels, wherein:
the determined touch state is one of a set of touch states comprising a non-touch event, a hover event, and a touch event; and
the touch threshold levels are arranged such that:
when the delta change is less than a first touch threshold level, then the determined touch state is the non-touch event;
when the delta change is greater than the first touch threshold level and less than a second touch threshold level, then the determined touch state is the hover event; and
when the delta change is greater than the second touch threshold level, then the determined touch state is the touch event;
select, based on the determined touch state, a specific touch location prediction method from a plurality of available touch location prediction methods for the determined touch state; and
determine a predicted touch location of the touch input based on the touch location prediction method and the sensor data.

16. The media of claim 15, wherein the touch panel comprises a plurality of sensors, and wherein the plurality of sensors are positioned in a pattern on the touch panel where a first subset of sensors are configured as source sensors and a second subset of sensors are configured as read sensors.

17. The media of claim 16, wherein the pattern comprises one or more of a stripe pattern, a U-shaped stripe pattern, an H-shaped stripe pattern, a diamond-stripe pattern, a diamond-middle-stripe pattern, a full-wriggle-stripe pattern, a wriggle-middle-stripe pattern, a triangle-rectangle-stripe pattern, a triangle-stripe pattern, or a double-triangle-stripe pattern.

18. The media of claim 16, wherein the instructions are further executable by the processor to:
inject a plurality of signals into one or more of the source sensors, wherein the plurality of signals comprise at least a first signal at a first frequency and a second signal at a second frequency; and
detect, by one or more of the read sensors, a plurality of attenuated measured signals based on the touch input interfacing the plurality of signals, wherein the plurality of attenuated measured signals are used to generate the sensor data.

19. The media of claim 16, wherein the instructions are further executable by the processor to:
switch the first subset of sensors to be configured as read sensors and the second subset of sensors to be configured as source sensors at a predetermined frequency, wherein the sensor data includes data from a plurality of attenuated measured signals based on the touch input interfacing a plurality of injected signals that are injected to each of the source sensors.

20. The media of claim 15, wherein the plurality of available touch location prediction methods comprises one or more of a look up table method, a curve fitting method, or a machine learning model method.

\* \* \* \* \*